(12) United States Patent
Furukawa

(10) Patent No.: US 7,756,653 B2
(45) Date of Patent: Jul. 13, 2010

(54) STORAGE MEDIUM STORING THEREON POWER CONSUMPTION ANALYSIS PROGRAM, AND POWER CONSUMPTION ANALYSIS METHOD

(75) Inventor: Eiji Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 12/054,158

(22) Filed: Mar. 24, 2008

(65) Prior Publication Data

US 2008/0243403 A1 Oct. 2, 2008

(30) Foreign Application Priority Data

Mar. 27, 2007 (JP) ............................. 2007-081057

(51) Int. Cl.
*G06F 19/00* (2006.01)
(52) U.S. Cl. ....................................................... 702/61
(58) Field of Classification Search .................. 702/61, 702/64, 182–185
See application file for complete search history.

(56) References Cited

U.S. PATENT DOCUMENTS 6,075,932 A * 6/2000 Khouja et al. .................. 716/4

FOREIGN PATENT DOCUMENTS

| JP | A 9-305648 | 11/1997 |
| JP | A 11-67925 | 3/1999 |

* cited by examiner

*Primary Examiner*—Edward Raymond
(74) *Attorney, Agent, or Firm*—Greer, Burns & Crain, Ltd.

(57) ABSTRACT

A storage medium stores a power consumption analysis program operable to cause a computer to function as a power consumption analysis apparatus. The apparatus includes a device for preliminarily providing a first toggle rate of each of a plurality of wirelines included in a first circuit data set; a device for generating a correlation in accordance with each first toggle rate and each load capacity of the corresponding wireline, each correlation being indicative of a relationship between the first toggle rate and the load capacity; and a device for calculating a second toggle rate of each of a plurality of wirelines included in a second circuit data set, in accordance with a load capacity of a corresponding wireline and the corresponding correlation.

16 Claims, 16 Drawing Sheets

FIG. 4A

| WIRELINE | LOAD CAPACITY |
|---|---|
| A | 140 |
| B | 130 |
| C | 150 |
| D | 110 |
| E | 100 |
| F | 120 |
| G | 80 |
| H | 70 |
| I | 90 |

FIG. 4B

| WIRELINE | LOAD CAPACITY | TOGGLE RATE |
|---|---|---|
| A | 140 | 0.020 |
| B | 130 | 0.023 |
| C | 150 | 0.017 |
| D | 110 | 0.030 |
| E | 100 | 0.033 |
| F | 120 | 0.027 |
| G | 80 | 0.040 |
| H | 70 | 0.043 |
| I | 90 | 0.037 |

FIG. 5A

| WIRELINE | LOAD CAPACITY |
|---|---|
| A | 144 |
| B | 133 |
| C | 155 |
| D | 111 |
| E | 100 |
| F | 122 |
| G | 88 |
| H | 77 |
| I | 99 |

FIG. 5B

| WIRELINE | LOAD CAPACITY | TOGGLE RATE |
|---|---|---|
| A | 144 | 0.019 |
| B | 133 | 0.022 |
| C | 155 | 0.015 |
| D | 111 | 0.030 |
| E | 100 | 0.033 |
| F | 122 | 0.026 |
| G | 88 | 0.037 |
| H | 77 | 0.041 |
| I | 99 | 0.034 |

FIG. 7A

| WIRELINE | POWER CONSUMPTION |
|---|---|
| A | 28 |
| B | 30 |
| C | 26 |
| D | 33 |
| E | 33 |
| F | 32 |
| G | 32 |
| H | 30 |
| I | 33 |

FIG. 7B

| WIRELINE | POWER CONSUMPTION | PREVIOUS POWER CONSUMPTION |
|---|---|---|
| A | 28 | 27 |
| B | 30 | 33 |
| C | 26 | 27 |
| D | 33 | 38 |
| E | 33 | 31 |
| F | 32 | 34 |
| G | 32 | 28 |
| H | 30 | 34 |
| I | 33 | 30 |

FIG. 7C

| WIRELINE | POWER CONSUMPTION | PREVIOUS POWER CONSUMPTION | DIFFERENTIAL |
|---|---|---|---|
| A | 28 | 27 | +1 |
| B | 30 | 33 | −3 |
| C | 26 | 27 | −1 |
| D | 33 | 38 | −5 |
| E | 33 | 31 | +2 |
| F | 32 | 34 | −2 |
| G | 32 | 28 | +4 |
| H | 30 | 34 | −4 |
| I | 33 | 30 | +3 |

FIG. 12A

| WIRELINE | LOAD CAPACITY |
|---|---|
| A | 140 |
| B | 130 |
| C | 150 |
| D | 110 |
| E | 100 |
| F | 120 |
| G | 80 |
| H | 70 |
| I | 90 |

FIG. 12B

| WIRELINE | LOAD CAPACITY | TOGGLE RATE |
|---|---|---|
| A | 140 | 0.020 |
| B | 130 | 0.023 |
| C | 150 | 0.017 |
| D | 110 | 0.030 |
| E | 100 | 0.033 |
| F | 120 | 0.027 |
| G | 80 | 0.040 |
| H | 70 | 0.043 |
| I | 90 | 0.037 |

FIG. 12C

| LOAD CAPACITY | TOGGLE RATE | |
|---|---|---|
| | AVERAGE | VARIANCE |
| [70,100] | 0.04 | 0.000009 |
| [100,130] | 0.03 | 0.000009 |
| [130,160] | 0.02 | 0.000009 |

FIG. 13A

| WIRELINE | LOAD CAPACITY |
|---|---|
| A | 140 |
| B | 130 |
| C | 150 |
| D | 110 |
| E | 100 |
| F | 120 |
| G | 80 |
| H | 70 |
| I | 90 |
| J | 145 |
| K | 115 |
| L | 85 |

FIG. 13B

| WIRELINE | LOAD CAPACITY | TOGGLE RATE |
|---|---|---|
| A | 140 | 0.020 |
| B | 130 | 0.023 |
| C | 150 | 0.017 |
| D | 110 | 0.030 |
| E | 100 | 0.033 |
| F | 120 | 0.027 |
| G | 80 | 0.040 |
| H | 70 | 0.043 |
| I | 90 | 0.037 |
| J | 145 | 0.020 |
| K | 115 | 0.030 |
| L | 85 | 0.040 |

FIG. 15A

| WIRELINE | LOAD CAPACITY |
|---|---|
| A | 140 |
| B | 130 |
| C | 150 |
| D | 110 |
| E | 100 |
| F | 120 |
| G | 80 |
| H | 70 |
| I | 90 |

FIG. 15B

| WIRELINE | LOAD CAPACITY | TOGGLE RATE |
|---|---|---|
| A | 140 | 0.020 |
| B | 130 | |
| C | 150 | |
| D | 110 | 0.030 |
| E | 100 | |
| F | 120 | |
| G | 80 | 0.040 |
| H | 70 | |
| I | 90 | |

FIG. 15C

| WIRELINE | LOAD CAPACITY | TOGGLE RATE |
|---|---|---|
| A | 140 | 0.020 |
| B | 130 | 0.024 |
| C | 150 | 0.017 |
| D | 110 | 0.030 |
| E | 100 | 0.034 |
| F | 120 | 0.027 |
| G | 80 | 0.040 |
| H | 70 | 0.044 |
| I | 90 | 0.037 |

STORAGE MEDIUM STORING THEREON POWER CONSUMPTION ANALYSIS PROGRAM, AND POWER CONSUMPTION ANALYSIS METHOD

TECHNICAL FIELD

The present invention relates to a computer-readable storage medium (simply "storage medium", herebelow) storing thereon a power consumption analysis program, and a power consumption analysis method. More specifically, the invention relates to a power consumption analysis program and method for computing the amount of power consumption of a semiconductor circuit in accordance with load capacities and toggle rates of wirelines of the semiconductor circuit.

In practical design of a semiconductor circuit, wirelines and the like are reconsidered and modified many times until completion of the design. As such, on each of such occasions, a designer has to calculate the power consumption of the modified semiconductor circuit in accordance with wireline load capacities and toggle rates of the circuitry, thereby to determine whether the result satisfies required conditions. The wireline load capacity can be relatively easily calculated when a process-targeted semiconductor circuit is determined. However, the respective toggle rates have to be calculated by simulating the operation of the modified semiconductor circuit. Consequently, there arises a problem that it potentially takes time and cost for the calculation of the toggle rates.

Further, as the scale of the semiconductor circuit (such as an LSI) is larger, the number of wirelines therein is larger. As such, in the case of a large semiconductor circuit, time and cost for the calculation of the wireline toggle rates are very large. More specifically, as a result of reconsideration/modification of wirelines and the like of such a large semiconductor circuit, the time (TAT: turn-around time) of the analysis process for the amount of power consumption is increased, potentially leading to a delay in design. To overcome the problem, a designer takes a countermeasure in such a manner that the analysis process of the amount of power consumption is not actually performed in each time of reconsideration/ modification, but an appropriate amount of power consumption is estimated. Thereby the analysis process for the amount of power consumption is performed only with respect to essential points of reconsideration/modification of wireline and the like.

SUMMARY

According to one embodiment of the present invention, there is provided a storage medium storing thereon a power consumption analysis program operable to cause a computer to function as a power consumption analysis apparatus. The apparatus includes a device for preliminarily providing a first toggle rate of each of a plurality of wirelines included in a first circuit data set; a device for generating a correlation in accordance with each first toggle rate and each load capacity of the corresponding wireline, each correlation being indicative of a relationship between the first toggle rate and the load capacity; and a device for calculating a second toggle rate of each of a plurality of wirelines included in a second circuit data set, in accordance with a load capacity of a corresponding wireline and the corresponding correlation.

BRIEF DESCRIPTION OF THE DRAWINGS

FIGS. 4A and 4B, respectively, are explanatory diagrams of the examples of power consumption analysis processes shown in FIGS. 3A and 3B;

FIGS. 5A and 5B, respectively, are explanatory diagrams of the examples of power consumption analysis processes shown in FIGS. 3A and 3B;

FIGS. 7A to 7C, respectively, are explanatory diagrams of the power consumption analysis process;

FIGS. 12A to 12C are explanatory diagrams of an example of the power consumption analysis process shown in FIG. 9;

FIGS. 13A and 13B are explanatory diagrams of another example of the power consumption analysis process shown in FIG. 9;

FIGS. 15A to 15C are explanatory diagrams of the example of the power consumption analysis process shown in FIG. 14.

DETAILED DESCRIPTION OF PREFERRED EMBODIMENTS

Figure 1:
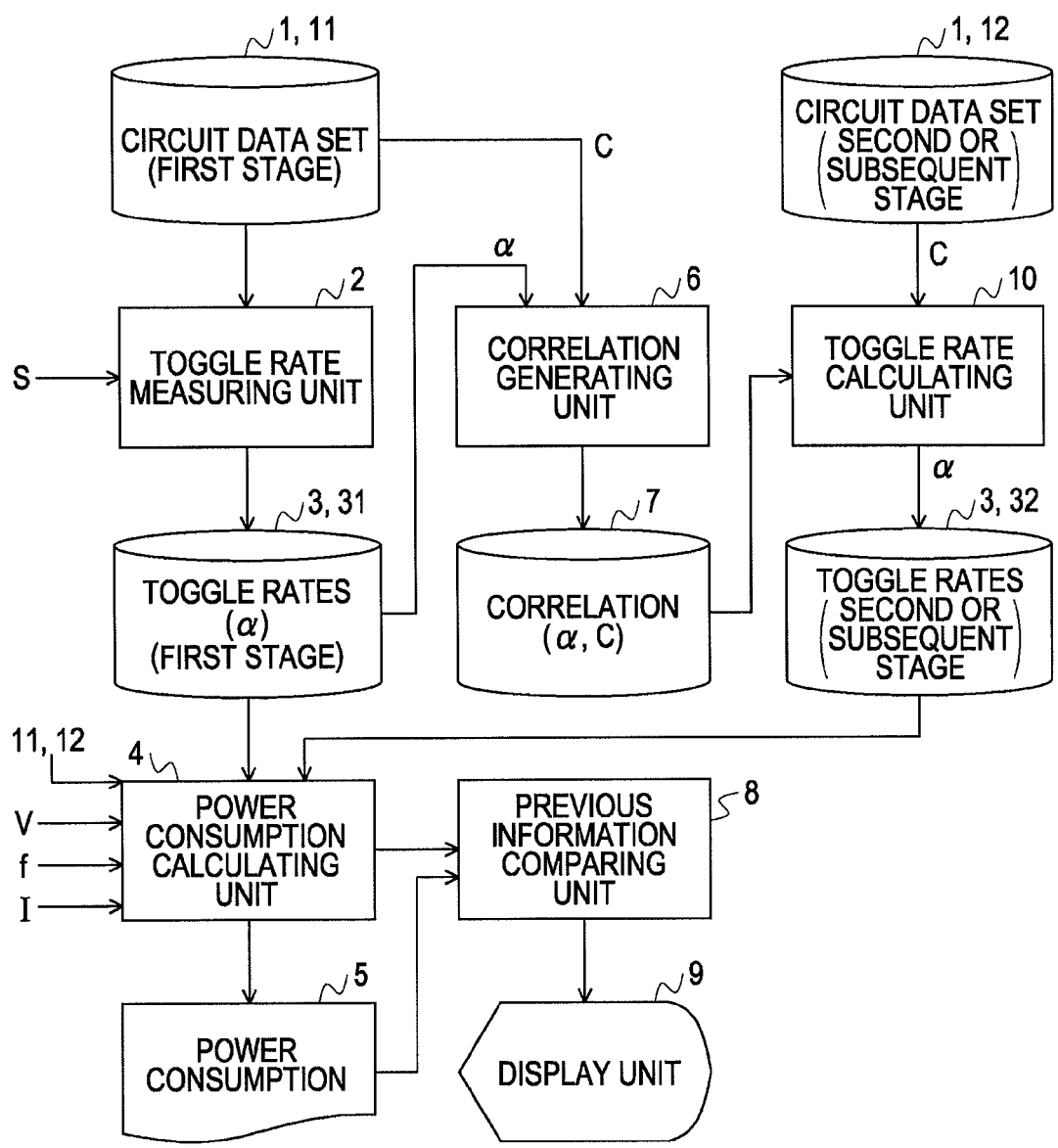
FIG. 1 is a diagram showing an example of the configuration of a power consumption analysis apparatus.

FIG. 1 is a diagram showing an example of the configuration of a power consumption analysis apparatus. The power consumption analysis apparatus includes an toggle rate measuring unit 2, a power consumption calculating unit 4, a correlation generating unit 6, a previous information comparing unit 8, a display unit 9, and an toggle rate calculating unit 10. The power consumption calculating unit 4 is, for example, implemented in the manner that a power consumption analysis program existing in a main memory is executed on a central processing unit (CPU). The toggle rate measuring unit 2, the correlation generating unit 6, the previous information comparing unit 8, and the toggle rate calculating unit 10, respectively, are similarly implemented.

Circuit data sets 1 (11 and 12) are preliminarily prepared (preliminarily generated) by a tool, such as a designing apparatus (not shown), and are respectively input into the power consumption analysis apparatus. More specifically, the circuit data sets 11 and 12, respectively, are stored in circuit storage units or memories (11 and 12). Toggle rates 3 (31 and 32) and power consumption 5 are calculated by the power consumption analysis apparatus. Alternatively, the toggle rates 3 (31 and 32) may each be represented by α, herebelow.

The circuit data set 11 is a circuit data set (first or first version circuit data set) of a semiconductor circuit (LSI) that is obtained from first stage circuit design. The circuit data set 12 is a circuit data set (second or subsequent version circuit data set) of the semiconductor circuit that is obtained from second or subsequent stage circuit design. The toggle rate 31 is an toggle rate (first stage toggle rate) corresponding to the first stage circuit data set 11. The toggle rate 32 is an toggle rate (second or subsequent toggle rate) corresponding to the second or subsequent stage circuit data set 12. The second or subsequent stage circuit design process does not have to be a design process of the entirety of the semiconductor circuit, but may be a design process of a partial modification of the semiconductor circuit.

Figure 2:
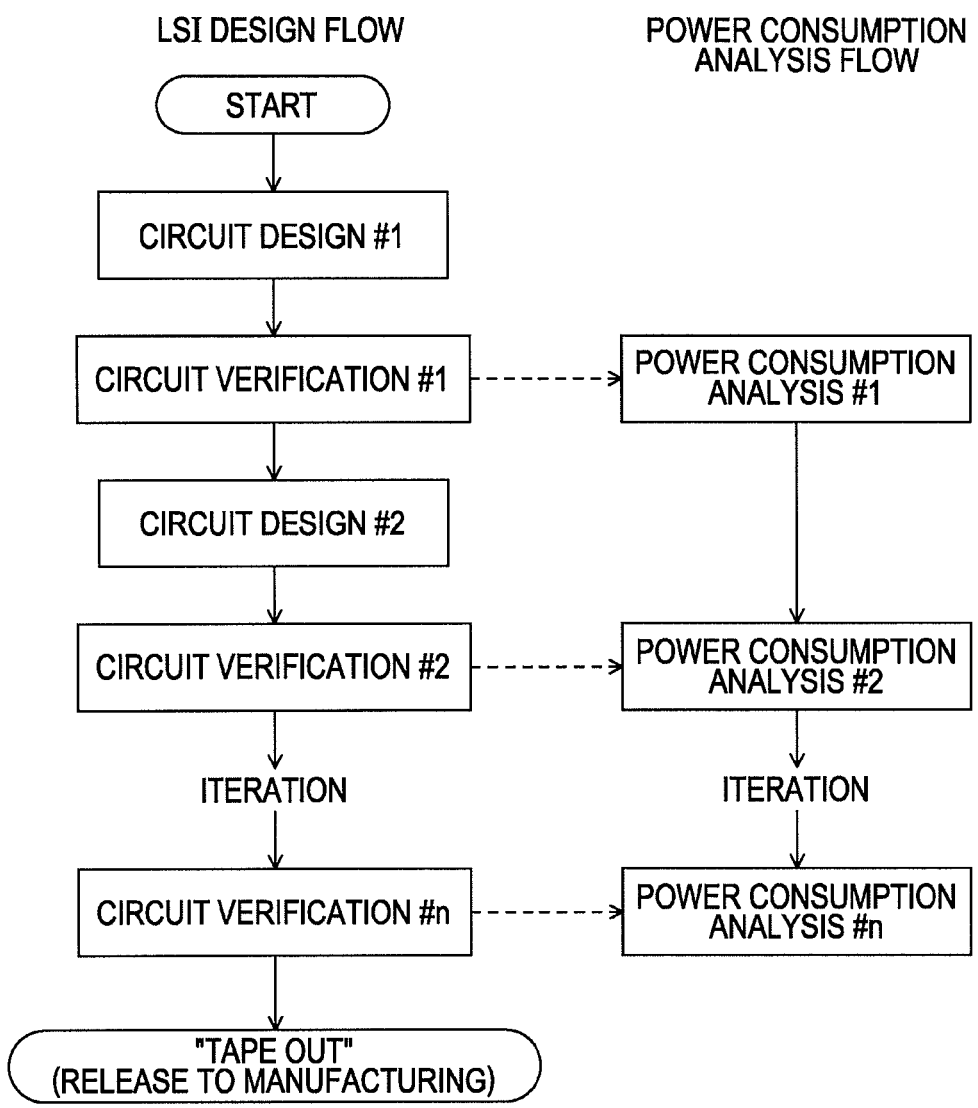
FIG. 2 is a flow chart showing the design process of a semiconductor circuit.

The design process of the semiconductor circuit is carried out along a flow such as described in FIG. 2. As a result of completion of a first stage circuit design process (circuit design process #1) of the semiconductor circuit, a first stage circuit data set 11 can be obtained. Then, first stage circuit verification (circuit verification #1) is performed for the first stage circuit data set 11. In the circuit verification #1, a first power consumption analysis (power consumption analysis #1) is executed by the power consumption analysis apparatus.

The series of the processes described above is executed as a first series process, and the first series process is iterated n times. More specifically, the circuit verification is executed in each circuit design process, and the power consumption analysis is executed in the course of the design process. As such, for the second or subsequent stage circuit data set 12, circuit verifications #2 to #n, and power consumption analyses #2 to #n are executed in the course of the circuit verifications #2 to #n.

The toggle rate measuring unit 2 is a device that measures respective first stage toggle rates 31 in accordance with the first stage circuit data set 11 in response to a command input operation (performed by a user) for initiation of execution of, for example, a simulation program S described further below. The respective first stage toggle rate 31 is calculated by a known (conventional) process, and is stored in an toggle rate storage unit or memory (31). More specifically, the first stage toggle rate 31 is calculated in the manner that operation of the semiconductor circuit is simulated by simulator (not shown) with the use of the first stage circuit data 11. As such, time and cost are necessary for the toggle rate calculation. In this case, the configuration may be such that the first stage toggle rate 31 is prepared (preliminarily generated) and input into the power consumption analysis apparatus. In this case, the simulation program S is loaded into the toggle rate measuring unit 2 and is executed therein to calculate the first stage toggle rate 31. In this manner, the first stage toggle rate 31 is calculated.

The toggle rate (%) is the probability of a transition of a signal value from a high/low to low/high level in one clock cycle in a wireline. It is assumed herein that the toggle rate is 100% when the probability is similar as in the clock (i.e., when two transitions occur per one clock cycle).

The toggle rate calculating unit 10 is a device that, in accordance with the second or subsequent stage circuit data set 12, calculates a respective toggle rate 32 (second or subsequent stage toggle rate) corresponding to the circuit data set 12 in response to, for example, the command input operation for execution initiation. A respective correlation 7 is used for the calculation. More specifically, in accordance with the second or subsequent stage circuit data set 12 and correlation 7, the toggle rate calculating unit 10 calculates the respective second or subsequent stage toggle rate 32 and stores it into an toggle rate storage unit or memory (32). Thus, although the first stage first stage toggle rate 31 is calculated by the known process, the second or subsequent stage toggle rate 32 is calculated in accordance with the inventive manner, thereby to differentiate the toggle rates 31 and 32 from each other.

The correlation generating unit 6 is a device that, in response to a notification of completion of calculation of the first stage toggle rate 31, generates the correlation 7 in accordance with the first stage circuit data set 11 and toggle rate 31. The correlation generating unit 6 stores the generated correlation 7 into a correlation storage unit or memory (7). The correlation 7 is generated prior to calculation of the second or subsequent stage toggle rate 32. The correlation 7 is information indicative of the correlation between a load capacity C and toggle rate α of a respective wireline. By necessity, the correlation 7 will be represented as "r" or "r(α, C)", herebelow. As described below in more detail, the correlation 7 is different corresponding to a calculation process therefor.

In practice, the wireline load capacity C in the first stage circuit data set 11 is calculated by a load capacity calculating unit (not shown) before calculation of the first stage first stage toggle rate 31. The load capacity C can be relatively easily calculated when the circuit data set is determined. Alternatively, however, the configuration may be such that the respective first stage circuit data set 11 includes the load capacity C preliminarily calculated by the designing apparatus (not shown). A similar arrangement may be made for the wireline load capacity C in the second or subsequent stage circuit data set 12.

The power consumption calculating unit 4 is a device that calculates the respective power consumption 5 by use of the toggle rates 3 (31 and 32) in response to, for example, a command input operation for initiation of execution. Then the power consumption calculating unit 4 either stores the power consumption 5 into a power consumption storage unit or memory (5) or prints out the power consumption 5 from a printer (not shown). Alternatively, the power consumption 5 may be represented by P, hereinbelow. The power consumption P of the semiconductor circuit is calculated by $$P = Pd + Ps$$

$$Pd = \Sigma(\alpha \times C) \times V^2 \times f$$

$$Ps = Ileak \times V$$

In the formulae, Pd denotes a power consumption in a dynamic mode of the semiconductor circuit (the amount of power consumed in the semiconductor circuit during operation), and dynamically variable; Ps denotes a power consumption in a static mode of the semiconductor circuit (the amount of power consumed in the semiconductor circuit even during non-operation), and takes substantially a constant value (since Ps is thus constant, calculation thereof can be omitted).

V denotes an operating voltage; f denotes an operating frequency; and Ileak denotes a leaking current. The operating voltage V, the operating frequency f, and the leaking current are input into the power consumption calculating unit 4. The leaking current Ileak is mainly a leaking current in a PN junction, so that when the circuit data set is determined, the leaking current Ileak can be easily calculated in accordance with the data set. As such, the configuration may be such that the leaking current Ileak is calculated by the power consumption calculating unit 4. The circuit data sets 11 and 12 also are input into the power consumption calculating unit 4. In this case, the load capacity C is similarly input into the power consumption calculating unit 4. The load capacity C is mainly a wireline capacity and junction capacity, so that when the circuit data set is determined, the load capacity C can be easily calculated in accordance with the load capacity C and the correlation r. The toggle rate α is calculated using the load capacity C and the correlation r in accordance with a predetermined manner of the present embodiment.

The range (section) of one wireline is determined in accordance with the circuit data set. In addition, even the length, area size, and the like of one wireline, and circuit elements (such as an AND gate and inverter) connected to the wireline are determined in accordance with the circuit data set. As such, for one wireline, the leaking current and load capacity C of the wireline are calculated. The leaking current and load capacity C of one wireline include the leaking current and load capacity C of the circuit element connected to the wireline.

The previous information comparing unit 8 is a device that performs comparison between a power consumption calculated from a latest circuit data set and an immediately previous stage circuit data set to the latest circuit data set in response a notification of the power consumption, which corresponds to the latest circuit data set, from the power consumption calculating unit 4. More specifically, it is herein assumed that the latest circuit data set is an i-th stage circuit data set (12). In this case, the previous information comparing unit 8 performs comparison between a power consumption P(i−1) calculated regarding an (i−1)th circuit data set and a respective power consumption Pi calculated for the i-th circuit data set.

The power consumption Pi is input into the previous information comparing unit 8 from the power consumption calculating unit 4. The power consumption P(i−1) is obtained by the previous information comparing unit 8 from the power consumption storage unit storing the power consumption 5. After the comparison between the power consumption Pi and the power consumption P(i−1), the previous information comparing unit 8 calculates a differential therebetween and notifies the display unit 9 of the result for display thereon. For example, the display unit 9 operates such that a circuit diagram of the semiconductor circuit is generated in accordance with the circuit data sets 11 and 12, a wireline having a largest differential in the circuit diagram corresponding to the i-th time (latest) circuit data set is highlight-displayed on the display unit 9. As such, also the circuit data sets 11 and 12 are input into the display unit 9. With the operation, the (i−1)th stage circuit data set is changed to the i-th time, whereby the user is enabled to easily know the wireline having the largest variation in power consumption.

Toggle rate calculation processes according to the present invention and power consumption analysis processes using the calculation processes will be described in detail hereinbelow with reference to the accompanying flow charts and other drawings.

Figure 3A:
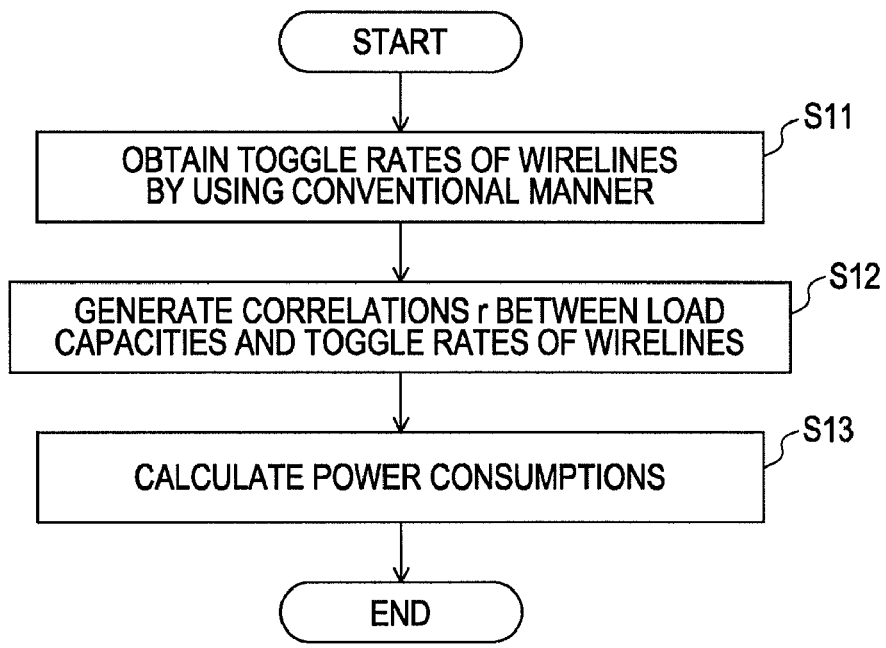
FIGS. 3A and 3B, respectively, are flow charts of examples of power consumption analysis processes.
Figure 3B:
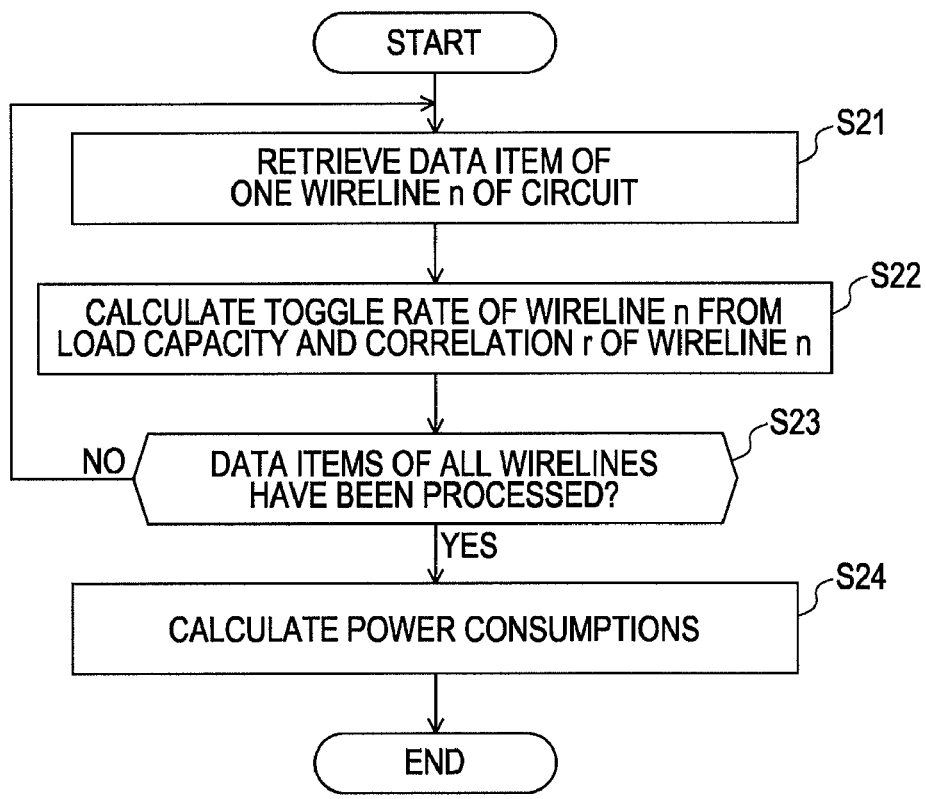

FIGS. 3A and 3B, respectively, are flow charts of examples of power consumption analysis processes. More specifically, FIG. 3A is a flow chart of an exemplary power consumption analysis process for the first stage circuit data set 11, and FIG. 3B is a flow chart of an exemplary power consumption analysis process for the second or subsequent stage circuit data set 12. FIGS. 4A and 4B and FIGS. 5A and 5B, respectively, are explanatory diagrams of the example power consumption analysis processes shown in FIGS. 3A and 3B.

According to the respective example shown in FIG. 3A, 3B, as described above, the process is performed for the first stage circuit data set 11 in the following manner. As descried above, toggle rates α (first toggle rates) of respective wirelines of the first stage circuit data set 11 are calculated in the manner that the first stage circuit data set 11 is simulated with the simulator (in the simulation manner or conventional manner). In addition, a table t (FIG. 4B) of load capacities C and the first toggle rates α, and respective correlations r are generated in accordance with the table t. For the second or subsequent stage circuit data set 12, toggle rates α are calculated in accordance with the respective correlations r and the load capacities C of the respective wirelines.

More specifically, first, load capacities C (FIG. 4A) of the respective wirelines are calculated by the load capacity calculating unit (not shown) (at step S11). In addition, as shown in FIG. 3A, the toggle rates α of the respective wirelines are calculated by the toggle rate measuring unit 2 in the simulation manner in accordance with the first stage circuit data set 11 (at step S11). The table t of the load capacities C and toggle rates α of the respective wirelines are generated by the correlation generating unit 6, and respective correlations r are generated thereby in accordance with the table t (at step S12). Then, power consumptions P are calculated by the power consumption calculating unit 4 in accordance with the load capacities C and toggle rates α of the respective wirelines (at step S13).

As an example, it is assumed that, as shown in FIG. 4A, as a result of completion of first stage circuit design, a semiconductor circuit including nine wirelines A to I is present (hence, first stage circuit data set 11 is present). When the first stage circuit data set 11 is determined, load capacities C of the wirelines A to I are calculated. The calculation is performed in the conventional manner. The calculated load capacities C are shown in FIG. 4A. In practice, the load capacities C are stored together with the first stage circuit data set 11. In other words, the load capacities C may be considered to configure part of the circuit data set (this applies also in description below).

Subsequently, in accordance with the first stage circuit data set 11 of the wirelines A to I, toggle rates α thereof are calculated. The calculated toggle rates α are shown in FIG. 4B (which shows the table t). More specifically, in FIG. 3A, while the generation of the table t is not shown as one step, the table t is generated in practice in a similar manner as at step S42 in FIG. 9 described below.

Subsequently, in accordance with the load capacities C and the toggle rates α, correlations r between the respective load capacities C and toggle rates α of the wirelines A to I are generated. In the present example, the respective correlation r is generated with the use of the least squares method. More specifically, in accordance with the respective load capacity C and load capacity C shown in FIG. 4B, the respective correlation r is calculated to be: α=−0.00033C+0.0663.

Subsequently, power consumptions P are calculated for the semiconductor circuit, which includes the wirelines A to I, by use of the respective toggle rates α.

After the above operation, design of the semiconductor circuit, which includes the wirelines A to I, is changed. More specifically, as a result of completion of the second or subsequent stage circuit design, the second or subsequent stage circuit data set 12, as shown in FIG. 5A, of the semiconductor circuit, which includes the wirelines A to I, can be obtained. When the second or subsequent stage circuit data set 12 is thus determined, load capacities C of the wirelines A to I are calculated in accordance with the conventional manner. The load capacities C thus calculated are shown in FIG. 5A. For example, in regard to the wireline A, the load capacity C thereof is varied to from 140 in FIG. 4A to 144 in FIG. 5A. In regard to other wirelines, similar variations occur.

Then, as shown in FIG. 3B, the toggle rate calculating unit 10 operates as follows. A wireline data item of one wireline n is retrieved from the second or subsequent stage circuit data set 12 (at step S21). Then, with regard to the data item of the one wireline n thus retrieved, an toggle rate α thereof is calculated in accordance with a corresponding load capacity C and correlation r (at step S22). More specifically, the toggle rate calculating unit 10 performs processing as follows. The correlation r is referenced by use of the load capacity C, and an toggle rate α corresponding to the load capacity C is calculated. Then, the processing determines whether the process of data items of all of the wirelines included in the circuit data set 12 has been completed or not (at step S23). If the process has not been completed, then the routine of the step S21 and subsequent steps is iteratively executed. Otherwise, if the process has been completed, power consumptions P of the all of the wirelines are calculated by the power consumption calculating unit 4 in accordance with the load capacities C and toggle rates α calculated for the all of the wirelines (at step S24).

For example, the toggle rate calculating unit 10 operates as follows. Calculations are performed to obtain toggle rates α in accordance with the corresponding second or subsequent stage circuit data set 12 of the wirelines A to I. The calculations are performed not in accordance with the simulation manner, but are performed by using the corresponding load capacities C and correlations r in accordance with the process described in the present embodiment. According to the process described in the present embodiment, the respective toggle rate α can be easily calculated in accordance with the corresponding load capacity C and correlation r.

More specifically, for example, in the case of the wireline A, since the correlation r is "α=−0.00033C+0.0663," when 144 is assigned to C (i.e., when C=144), α=0.01878≈0.019. Similarly, respective toggle rates α are calculated for other wirelines in accordance with the corresponding load capacities C and correlations r. Calculated toggle rates α are shown in FIG. 5B.

Subsequently, for the semiconductor circuit, which includes the wirelines A to I, respective power consumptions P are calculated by use of the corresponding load capacities C and toggle rates α. Since the toggle rates α can be easily calculated, the power consumptions P (in particular, power consumptions Pd) can be easily calculated as well.

Figure 6:
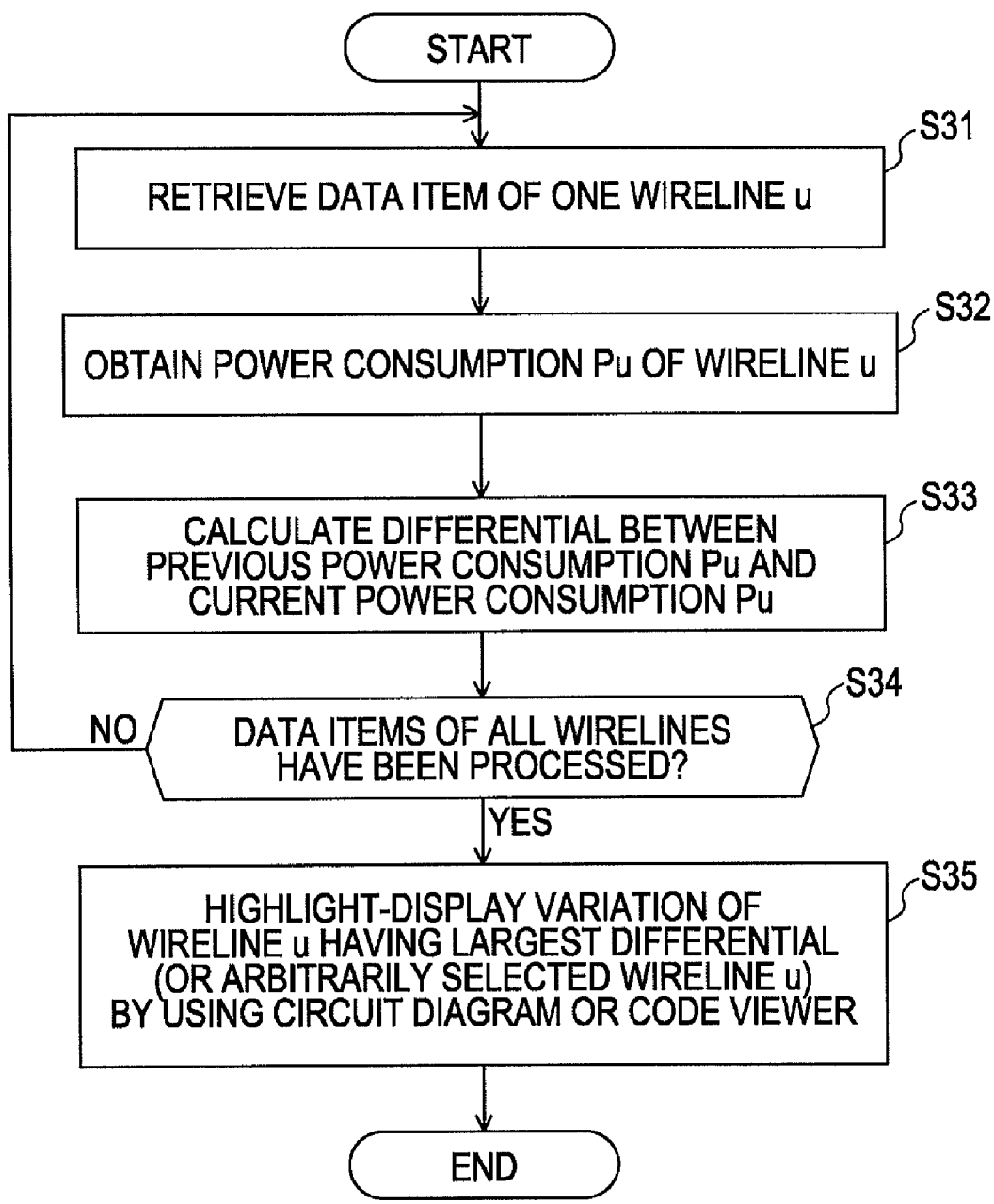
FIG. 6 is a flow chart related to the examples of the respective power consumption analysis processes.
Figure 8:
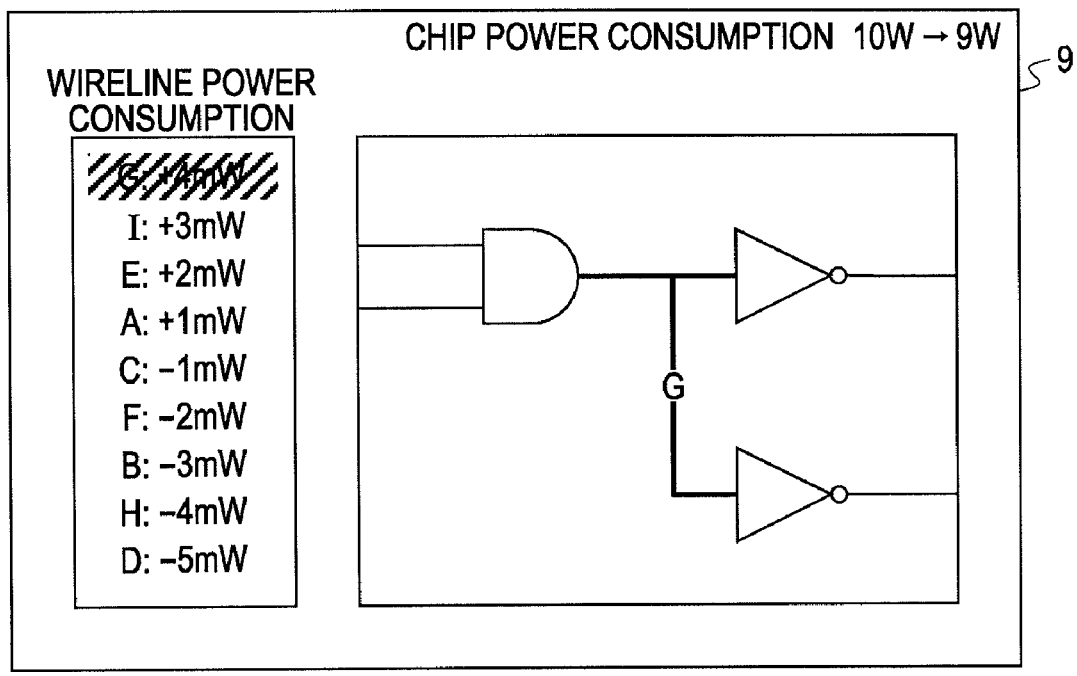
FIG. 8 is an explanatory diagram of the example of the power consumption analysis process.

FIG. 6 is a flow chart of the power consumption analysis process; and more specifically, it shows the process at step S13 of FIG. 3A or at step S24 of FIG. 3B. FIGS. 7A to 7C, respectively, are explanatory diagrams of an example of the power consumption analysis process. FIG. 8 is an explanatory diagram of an example power consumption analysis process.

The power consumption calculating unit 4 operates in the manner that a data item of one wireline u is retrieved from the first stage circuit data set 11 or 12 (at step S31), and a power consumption Pu of the wireline u is calculated (at step S32). Then, the previous information comparing unit 8 operates in the manner that a differential (that is, an increment) between a power consumption ("previous power consumption Pu", hereinbelow) calculated in the previous process Pu and the power consumption Pu ("present power consumption Pu", hereinbelow) calculated at step S32 is calculated (at step S33). Then, it is determined whether the process of all of wirelines u has been completed (at step S34). If the process of all of the wirelines u has not yet been completed, then the routine of the step S31 and subsequent steps is iteratively executed. Then the display unit 9 specifies a wireline u with a largest differential (or an arbitrarily selected wireline u) and highlight-displays it on a circuit diagram (or a code viewer) of the semiconductor circuit (at step S35).

As examples, present power consumptions Pu are shown in FIG. 7A, and previous power consumptions Pu are shown in FIG. 7B. More specifically, in FIG. 7B, also the present power consumptions Pu are shown. Further, the differentials between the previous and present power consumptions Pu are shown in FIG. 7C. As can be seen from FIG. 7C, the wireline with the largest differential (increment) is the wireline G. Then, as shown in FIG. 8, the wireline G is highlight-displayed on a circuit diagram (wiring diagram or logical circuit diagram (actually, a part of the diagram)) displayed on the display unit 9. More specifically, the wireline G is list-displayed on the top of a wireline power consumption display field, and highlighted in, for example, a halftone display fashion. In addition, the wireline G is highlight-displayed using, for example, a thick line in the circuit diagram of the semiconductor circuit. In this event, as can be seen from the comparison between FIGS. 7C and 8, the wirelines A to I are arranged not in order from A to I, but is arranged in sequential order from largest to smallest differentials (increments). Further, the display mode is not limited to the above-described mode of such highlight display as described above, but may instead be the mode of data display in different sequential order.

Figure 9:
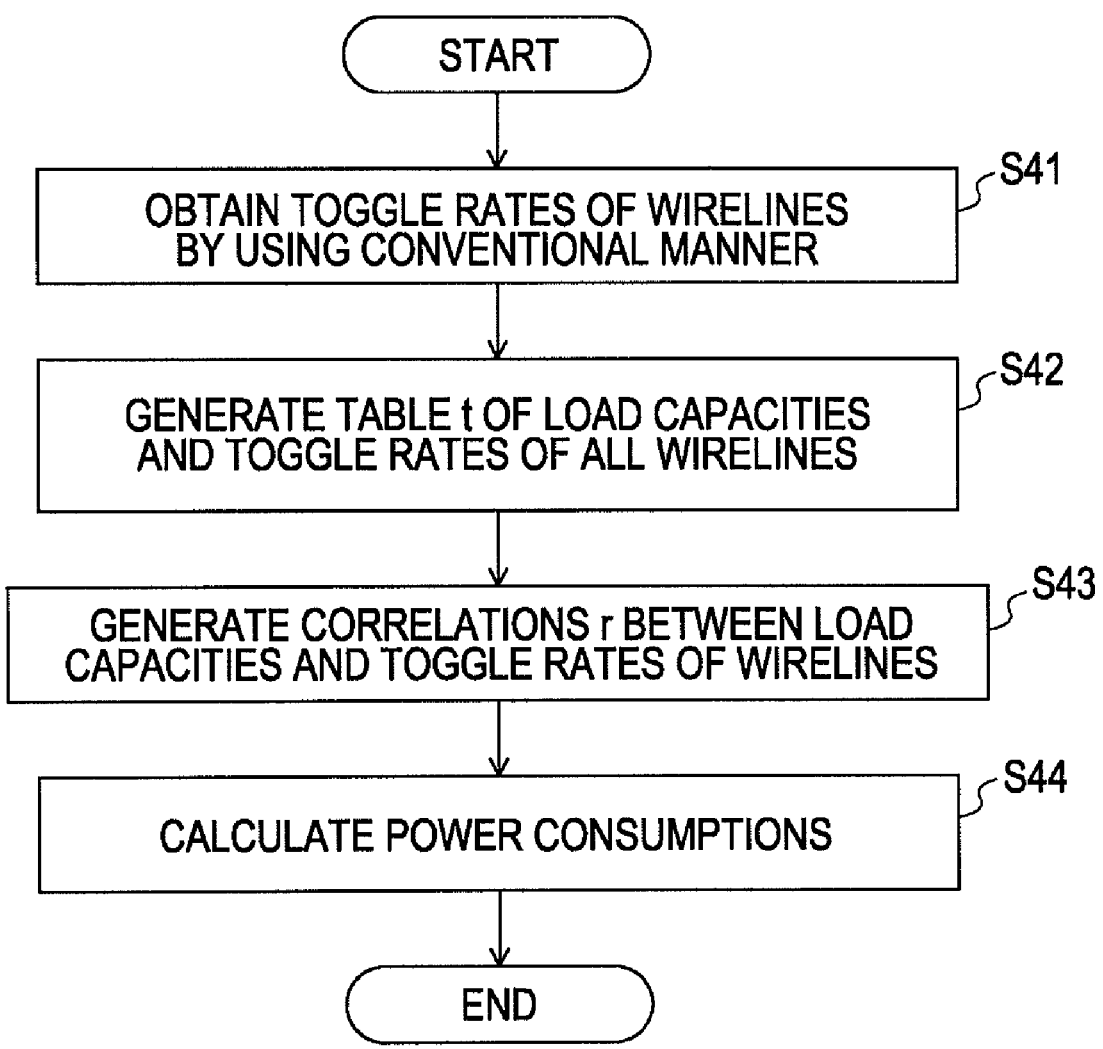
FIG. 9 is a flow chart of an example of a power consumption analysis process.
Figure 10:
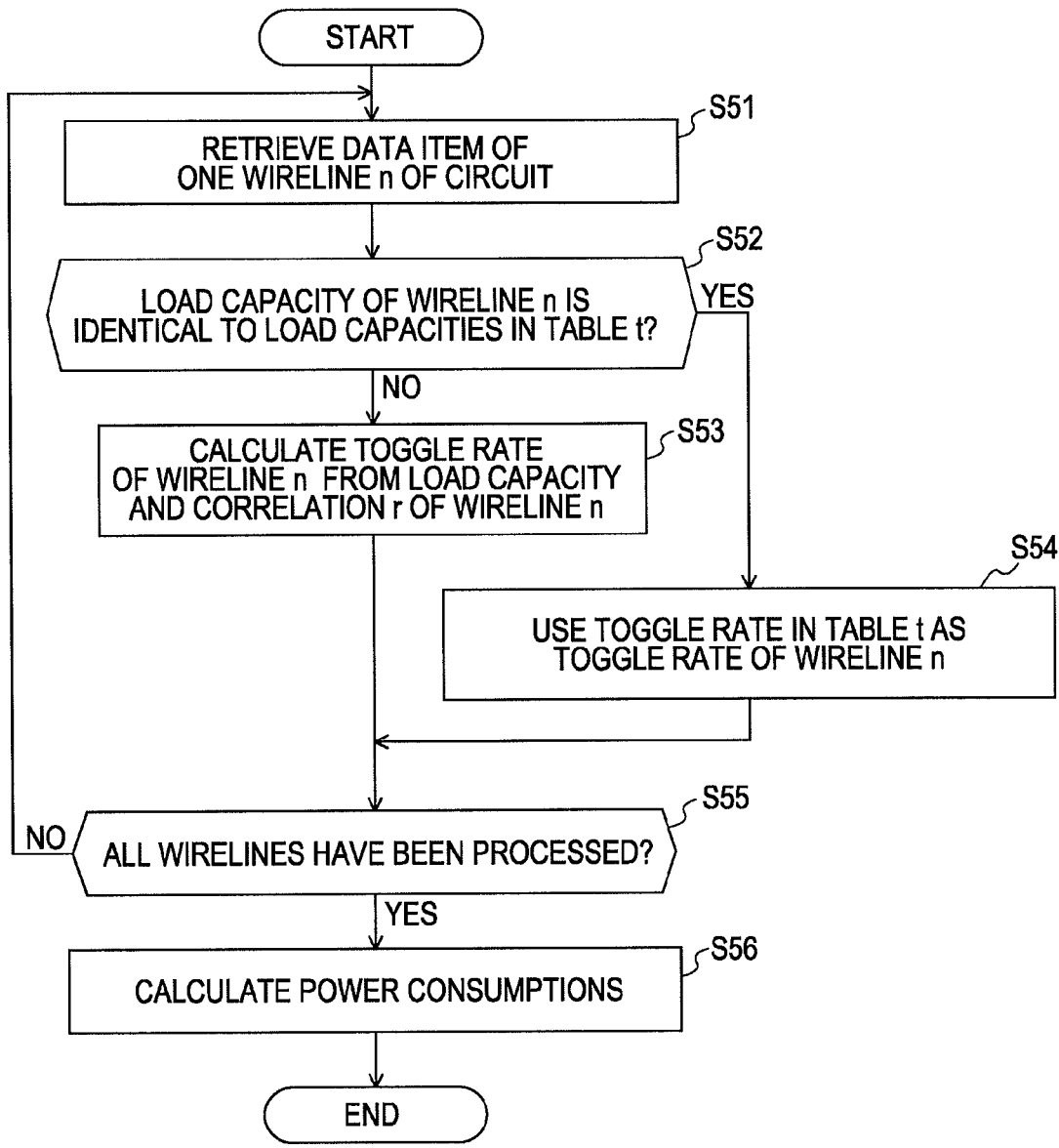
FIG. 10 is a flow chart of another example of the power consumption analysis process.

FIGS. 9 and 10, respectively, are flow charts of other examples of power consumption analysis processes in accordance with the present invention. In more particular, FIG. 9 is a flow chart showing a power consumption analysis process for the first stage circuit data set 11, and FIG. 10 is a flow chart showing a power consumption analysis process for the second or subsequent stage circuit data set 12. FIGS. 12 and 13, respectively, are explanatory diagrams of the examples of the power consumption analysis processes shown in FIG. 9.

According to the example shown in FIG. 9, the analysis process toggle rates α regarding the first stage circuit data set 11 are calculated by the use the simulation manner described above. In addition, in the analysis process, a table t (FIG. 12B) of load capacities C and toggle rates α is generated, and correlations r (FIG. 12C) are generated in accordance with the table t. In regard to the second or subsequent stage circuit data set 12, it is determined by referencing the table t whether the respective load capacities C of the wirelines are equal to the load capacities C in the first stage circuit data set 11. If the two are equal, then values corresponding to the load capacities C of the wirelines in the table t are used as toggle rates α for the second or subsequent stage circuit data set 12. The aforementioned values thus correspond to the load capacities C, and are toggle rates α regarding the first stage circuit data set 11. Otherwise, if the two are not equal, toggle rates α regarding the second or subsequent stage circuit data set 12 are respectively calculated in accordance with the load capacities C and the correlations r.

To begin with, the load capacity calculating unit (not shown) calculates respective load capacities C of the wirelines (see FIG. 12A), and further, as shown in FIG. 9, in accordance with the first stage circuit data set 11, toggle rates α are calculated by the toggle rate measuring unit 2 by use of the simulation manner (at step S41). A table t of the load capacities C and toggle rate α of the respective wirelines is generated by the correlation generating unit 6 (at step S42), and correlations r between the load capacities C and toggle rates α of the respective wirelines are generated thereby (at step S43). Then power consumptions P are calculated by the power consumption calculating unit 4 in accordance with the load capacities C and the toggle rates α of the respective wirelines (at step S44). In accordance with the process shown in FIG. 6, the power consumptions P are calculated as shown in FIGS. 7A to 7C, and are highlight-displayed as shown in FIG. 8 (a manner similar to the above described is applied also in step S56 in FIG. 10).

As an example, it is now assumed that, as a result of completion of the first stage circuit design, a semiconductor circuit including nine wirelines A to I is present, as shown in FIG. 12A. FIG. 12A is identical to FIG. 4A referenced above. When the first stage circuit data set 11 is determined, load capacities C of the wirelines A to I are calculated. The calculation is performed in the conventional manner. The calculated load capacities C are shown in FIG. 12A.

Subsequently, in accordance with the first stage circuit data set 11 of the wirelines A to I, toggle rates α thereof are calculated. In accordance with the calculated load capacities C and toggle rates α, a table t thereof is generated. The generated table t is shown in FIG. 12B.

Subsequently, in accordance with the generated table t, correlations r between the respective load capacities C and toggle rates α of the wirelines A to I are generated by the correlation generating unit 6. In the present example, the respective correlation r is generated to include an average and variance of the toggle rates α. More specifically, as shown in FIG. 12C, the section of the load capacities C is classified into three subsections [70, 100), [100, 130), and [130, 160). For example, [70, 100) indicates that load capacities C fall within the subsection of 70 or larger to less than 100. Load capacities C falling within the subsection [70, 100) are the wirelines G, H, and I, in which the average of the toggle rates α thereof is 0.04, and the variance is 0.000009. In a similar manner, the averages and variances are calculated for the respective subsections. Correlations r thus calculated are shown in FIG. 12C.

As the relationship between the load capacities C and toggle rates α is viewed, it can be known that, even in the case of wirelines having the same load capacity C, there is variation in the toggle rate α. As such, it is assumed that the variation is distributed in the manner of normal distribution. As such, in the case of a section (range) of the load capacities C, the average value of the toggle rates α in the section can be considered to substantially accurately represent the toggle rates α of wireline in that section.

In the respective correlation r, the average (value) is used as the toggle rate α, and the variance is used as a value indicative of variation in design change. While the average is essential for the correlation r, the variance can be omitted. Nevertheless, however, the variance is effective when used as a reference value for estimating an approximate value of the power consumption P in the generation of subsequent circuit data set obtained from a design change of the circuit data set.

Subsequently, the design of the semiconductor circuit, which includes the wirelines A to I is, is changed. More specifically, as shown in FIG. 13A, as a result of completion of the second or subsequent stage circuit design, the second or subsequent stage circuit data 12 of the semiconductor circuit including 12 wirelines A to L can be obtained. More specifically, the design change increases three wirelines J, K, and L. When a second or subsequent stage circuit data set 12 is determined, load capacities C of the respective wirelines A to L are calculated. The calculation is performed in accordance with the conventional manner, and the calculated load capacities C are shown in FIG. 13A. For convenience of description, it is herein assumed that the load capacities C of the wirelines A to I remain unchanged.

After the above, as shown in FIG. 10, the toggle rate calculating unit 10 operates as follows. A wireline data item of one wireline n is retrieved from the second or subsequent stage circuit data set 12 (at step S51). With regard to the retrieved the data item of one wireline n, it is determined by referencing the table t whether a corresponding load capacity C thereof is equal to the load capacity C in the first stage circuit data set 11 (at step S52). If the two are not equal, then an toggle rate α regarding the second or subsequent stage circuit data set 12 in accordance with the load capacity C and correlation r (at step S53). Otherwise, if the two are equal, then a value corresponding to the load capacity C in the table t (i.e., the value is the toggle rate α regarding the first stage circuit data set 11) is used as an toggle rate α for the second or subsequent stage circuit data set 12 (at step S54). Then, it is determined whether the process has been completed or not for all of the wirelines included in the second or subsequent stage circuit data set 12 (at step S55). When the process has not been completed, the routine of step S51 and subsequent steps is iteratively executed. What the process has been completed, the power consumption calculating unit 4 calculates the power consumption P for all the wirelines in accordance with the load capacity C and the toggle rate α calculated for all the wirelines (step S56).

Figure 11:
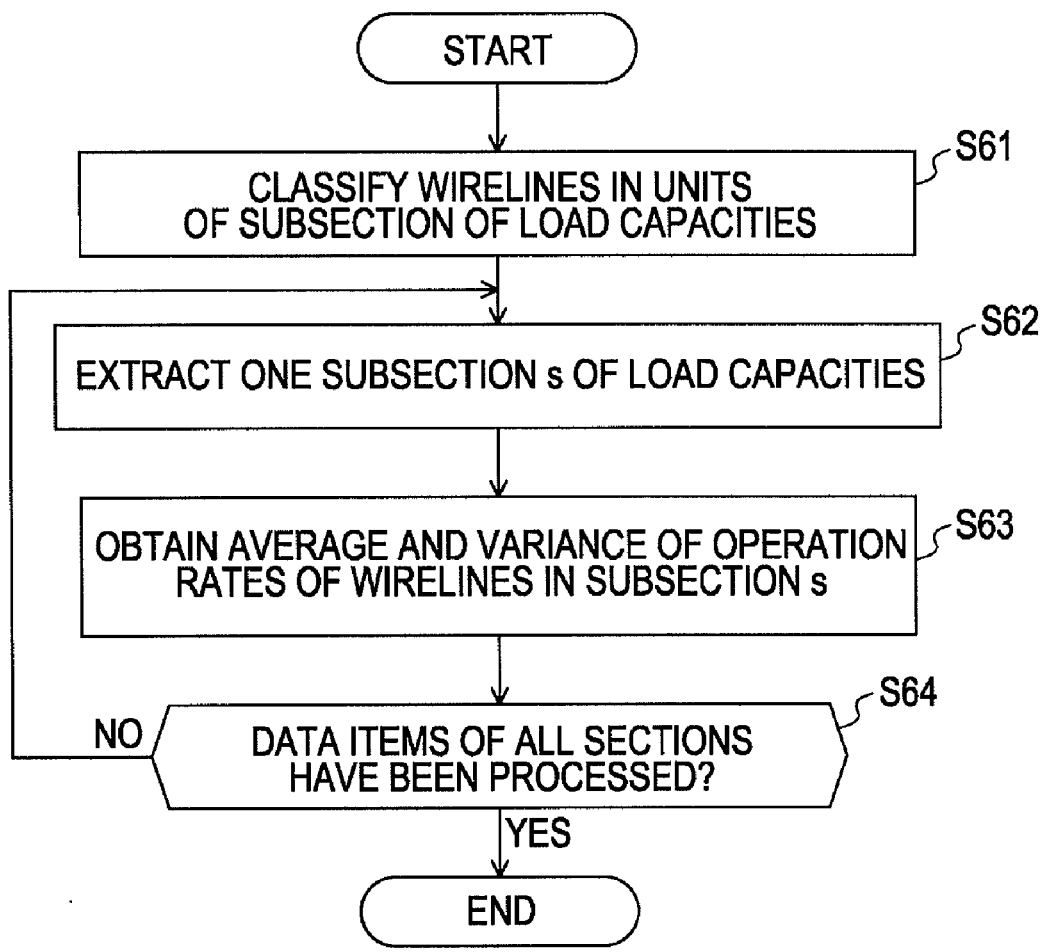
FIG. 11 is a flow chart of the power consumption analysis process.

FIG. 11 is a flow chart of the power consumption analysis process, showing a process at step S43 of FIG. 9.

The correlation generating unit 6 performs processing in the following manner. After the wirelines are classified in units of the subsection of load capacities C (at step S61), the average and variance of the toggle rates α of the respective wirelines within one subsection s are retrieved (at step S62), and an average and variance of the toggle rates α are calculated for the wirelines in the section s (at step S63). Thereafter, the processing determines whether all of the subsections s have been processed or not (at step S64). If the all of the subsection s have not as yet been processed, then the routine of the step S62 and subsequent steps is iteratively executed. Otherwise, if the all of the subsections s have been processed, the processing of the correlation generating unit 6 terminates.

For example, the power consumption calculating unit 4 performs processing as follows. Calculations are performed to obtain toggle rates α in accordance with the corresponding second or subsequent stage circuit data set 12 of the wirelines A to L. The calculations are performed not in accordance with the simulation manner, but are performed by using the corresponding load capacities C and correlations r in accordance with the present embodiment. According to the present embodiment, the respective toggle rate α can be easily calculated in accordance with the corresponding load capacity C and correlation r.

More specifically, for example, in the case of the wireline J, since the load capacity C is 145 and belongs to a subsection [130, 160), the [130, 160) of the correlations r is referenced. Since, in the correlations r, the average toggle rate α corresponding to the [130, 160) is 0.02, the value is used as an toggle rate α of the wireline J. Also for each of the wirelines K and L, an toggle rate α is similarly calculated in accordance with the corresponding load capacity C and correlation r. Calculated toggle rates α are shown in FIG. 13B.

Subsequently, for the semiconductor circuit, which includes the wirelines A to L, respective power consumptions P are calculated by use of the corresponding load capacities C and toggle rates α. Since the toggle rates α can be easily calculated, the power consumptions P (in particular, power consumptions Pd) as well can be easily calculated.

Figure 14:
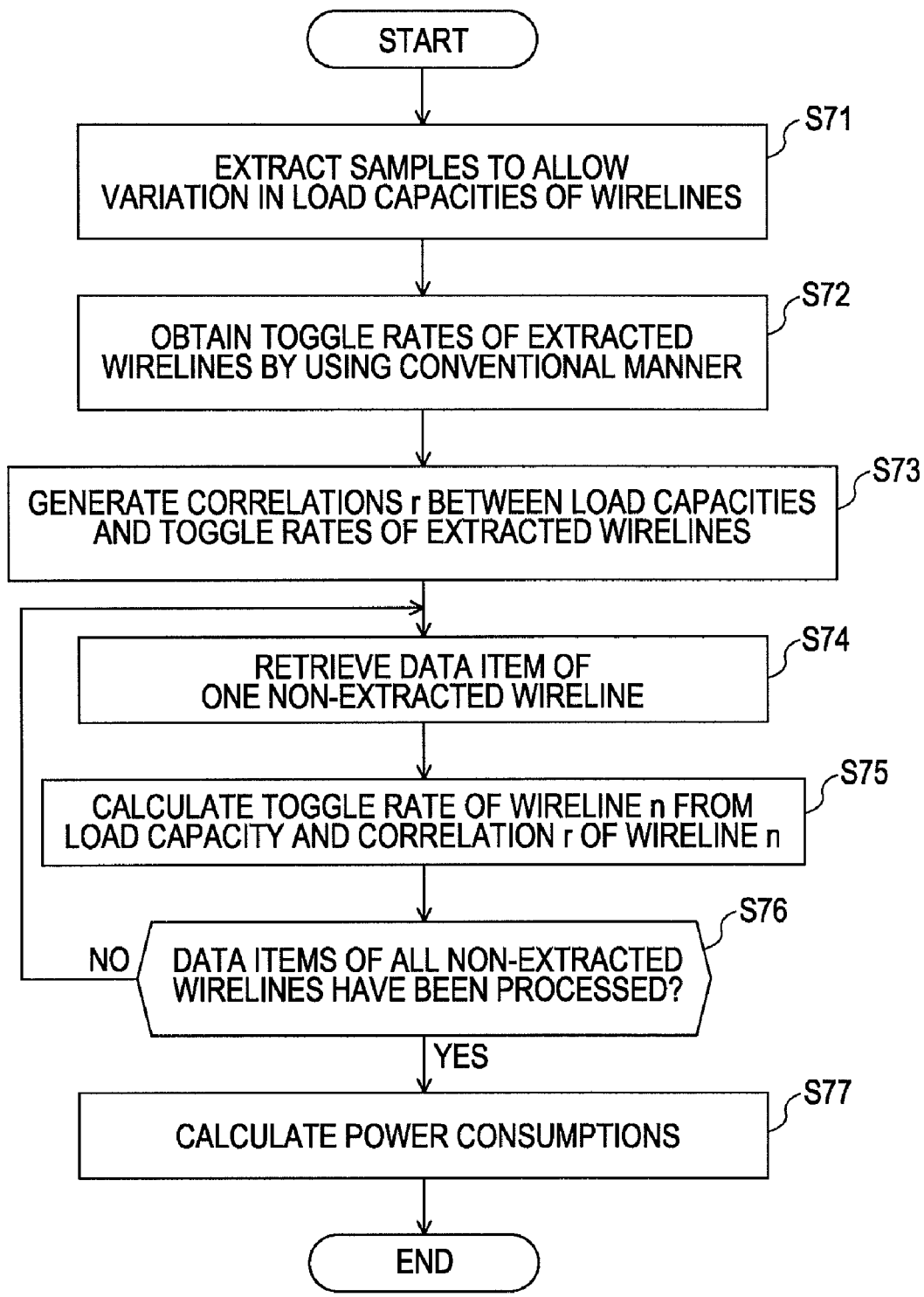
FIG. 14 is a flow chart of still another example of the power consumption analysis process.
Figure 16:
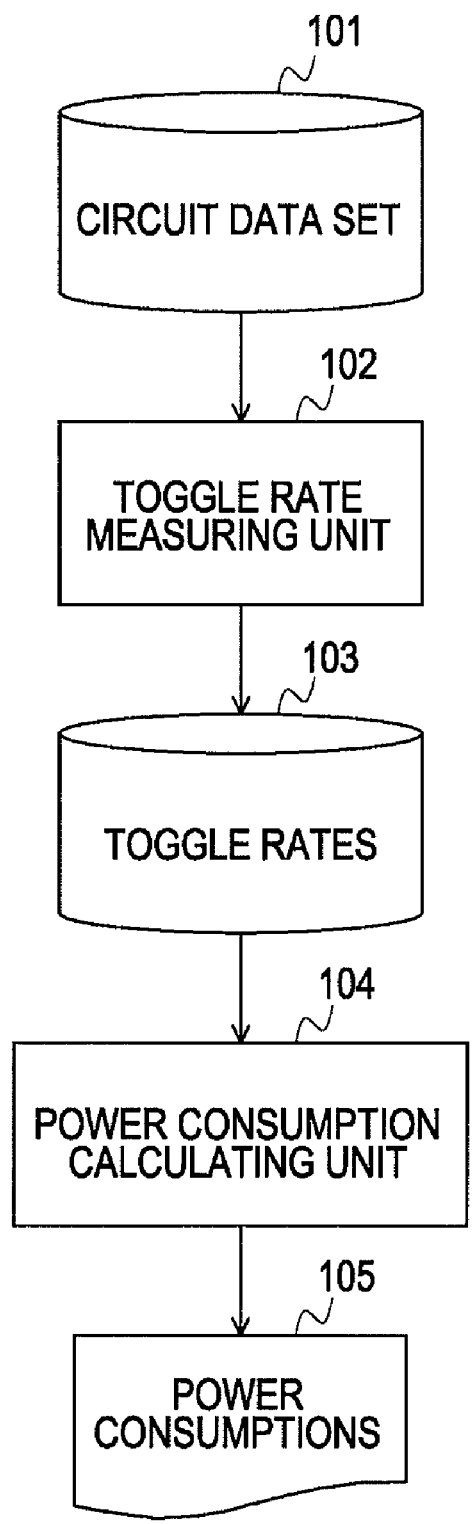
FIG. 16 is a diagram showing an example of the configuration of a conventional power consumption analysis apparatus.

FIG. 14 is a flow chart of still another example of the power consumption analysis process. More specifically, FIG. 14 shows the power consumption analysis process of the first stage circuit data set 11 and the second or subsequent stage circuit data set 12. FIG. 15 is an explanatory view of an example of the power consumption analysis process shown in FIG. 14.

In the example shown in FIG. 14, the first stage circuit data set 11 and the second or subsequent stage circuit data set 12 are not differentiated from each other. However, the circuit data set 11 or 12 is divided into two subsets, one subset of wirelines extracted as samples and the other subsets of wireline not extracted as samples. For the extracted wirelines, toggle rates α are calculated, correlations r between the load capacities C and the toggle rates α are calculated (FIG. 12C) in accordance with the simulation manner as described above. For the remaining wirelines (wirelines not extracted as samples), toggle rates α are calculated in accordance with the corresponding load capacities C and correlations r thereof as described above. As such, each time circuit data sets 11 and 12 are generated, extraction of wirelines, calculation of toggle rates α of the extracted wirelines, generation of correlations r, and calculation of toggle rates α of the remaining wirelines are iteratively performed.

Consequently, in the example shown in FIG. 14, instead of the first stage circuit data set 11, the circuit data subset of the extracted wirelines are input into the toggle rate measuring unit 2. Then, in accordance with the extracted circuit data subset of the wirelines, the toggle rate measuring unit 2 calculates toggle rates α of the wirelines instead of the first stage toggle rates α. On the other hand, instead of the circuit data set 12, the circuit data subset of the non-extracted wirelines are input into the toggle rate calculating unit 10. Then, in accordance with the non-extracted circuit data subset of the wirelines, the toggle rate calculating unit 10 calculates toggle rates α of the wirelines instead of the second or subsequent stage toggle rates α. The power consumption calculating unit 4 calculates power consumptions P in accordance with the toggle rates α of the extracted wirelines and the toggle rates α of the non-extracted toggle rates α of the wirelines.

First, as shown in FIG. 15A, load capacities C of wirelines are calculated by the load capacity calculating unit (not shown), and further, as shown in FIG. 14, wirelines as samples are extracted so that load capacities C of the wirelines are appropriately variable (at step S71). Then, toggle rates α of the extracted wirelines are calculated by the toggle rate measuring unit 2 by use of the simulation manner in accordance with data set 11 or 12 of the wirelines (at step S72). Subsequently, a table t of load capacities C and the toggle rates α of the extracted wirelines (only) is generated by the correlation generating unit 6, and further, correlations r between the load capacities C and toggle rates α of the respective wirelines are generated thereby (at step S73). Then, the toggle rate calculating unit 10 performs processing in the following manner. A data item of one wireline n is selected from among non-extracted wirelines (at step S74), and an toggle rate α of the extracted wireline n is calculated in accordance with the corresponding load capacity C and correlation r (at step S75). More specifically, an toggle rate α corresponding to the load capacity C is calculated using the load capacity C and thereby referencing the table t. Then, the processing determines whether the process of data items of all of the non-extracted wirelines has been completed or not (at step S76). If the process has not been completed, then the routine of the step S74 and subsequent steps is iteratively executed. Otherwise, if the process has been completed, power consumptions P of the all of the wirelines are calculated by the power consumption calculating unit 4 in accordance with the load capacities C and toggle rates α (at step S77). In this case, the power consumptions P are calculated in accordance with the process shown in FIG. 6 as shown in FIG. 7C and are highlight-displayed as shown in FIG. 8.

As an example, it is now assumed that, as a result of completion of the first stage circuit design, a circuit data set 11 or 12 of the semiconductor circuit including nine wirelines A to I is present, as shown in FIG. 15A. FIG. 15A is identical to FIG. 4A referenced above. When the circuit data set 11 or 12 is determined, load capacities C of the wirelines A to I are calculated. The calculation is performed in the conventional manner. The calculated load capacities C are shown in FIG. 15A.

Subsequently, the wirelines A, D, and G, for example, are extracted from among the wirelines A to I. As can be seen from FIG. 15A, load capacities C of the extracted wirelines are appropriately varied. The wirelines B, C, E, F, H, and I are non-selected wirelines. In regard to the wirelines A, D, and G, toggle rates α of the wirelines are calculated using the simulation manner in accordance with the data set 11 or 12 of the wirelines. In accordance with the calculated load capacities C and toggle rates α, a table t thereof is generated. The generated table t is shown in FIG. 15B. The table t lacks in data of some toggle rates α and is unfinished. However, the table t is not necessarily be generated, but the load capacities C and the toggle rates α can be retained as sample values.

Subsequently, in accordance with the generated table t, correlations r between the respective load capacities C and toggle rates α of the wirelines A to I are generated. In the present example, the respective correlation r is generated by use of the least squares method. More specifically, the respective correlation r is calculated to be: α=−0.00033C+0.0667 in accordance with the respective load capacities C and toggle rates α shown in FIG. 15B.

Subsequently, toggle rates α of the non-extracted wirelines B, C, E, F, H, and I, respectively, are calculated in accordance with the corresponding data set 11 or 12. In this case, the calculations are performed not in accordance with the simulation manner, but are performed by using the corresponding load capacities C and correlations r in accordance with the process described in the present embodiment. According to the process described in the present embodiment, each respective toggle rate α can be easily calculated in accordance with the corresponding load capacity C and correlation r.

More specifically, for example, in the case of the wireline B, since the correlation r is "α=−0.00033C+0.0667", when 133 is assigned to C (i.e., when C=133), α=0.0238≈0.024. Similarly, respective toggle rates α are calculated for other wirelines in accordance with the corresponding load capacities C and correlations r. The calculated toggle rates α are shown in FIG. 15C.

Subsequently, for the semiconductor circuit, which includes the wirelines A to I, respective power consumptions P are calculated by use of the corresponding load capacities C and toggle rates α. Since the toggle rates α can be easily calculated, the power consumptions P (in particular, power consumptions Pd) as well can be easily calculated.

What is claimed is:

1. A non-transitory storage medium storing thereon a power consumption analysis program operable to cause a computer to function as a power consumption analysis apparatus, the program comprising: means for preliminarily providing a first toggle rate of each of a plurality of wirelines included in a first circuit data set; means for generating a correlation in accordance with each first toggle rate and each load capacity of the corresponding wireline, each correlation being indicative of a relationship between the first toggle rate and the load capacity; and means for calculating a second toggle rate of each of a plurality of wirelines included in a second circuit data set, in accordance with a load capacity of a corresponding wireline and the corresponding correlation.

2. A non-transitory storage medium storing thereon a power consumption analysis program, according to claim 1, wherein the toggle rates preliminarily provided are generated through simulation of operation of the circuit using the first circuit data set.

3. A non-transitory storage medium storing thereon a power consumption analysis program, according to claim 1, wherein the correlation is determined as a relational expression between the corresponding toggle rate and load capacity through a least squares method in accordance with the preliminarily provided toggle rate and the load capacity of the corresponding wireline.

4. A non-transitory storage medium storing thereon a power consumption analysis program, according to claim 1, wherein load capacities are calculated in units of a section, and the correlation includes an average of the load capacities of wirelines belonging to the section.

5. A non-transitory storage medium storing thereon a power consumption analysis program, according to claim 4, wherein load capacities are calculated in units of a section, and the correlation includes a variance of the load capacities of wirelines belonging to the section.

6. A non-transitory storage medium storing thereon a power consumption analysis program, according to claim 1, wherein the first circuit data set is a circuit data set preliminarily provided, and the second circuit data set is a new circuit data set obtained through a change in the preliminarily provided circuit data set, the first toggle rates are respectively preliminarily provided for the plurality of wirelines included in the circuit data set preliminarily provided, and the second toggle rates are respectively calculated for the plurality of wirelines included in the new circuit data set in accordance with the load capacities and the correlations.

7. A non-transitory storage medium storing thereon a power consumption analysis program, according to claim 6, wherein the correlation is determined as a relational expression between the corresponding toggle rate and load capacity through a least squares method in accordance with the preliminarily provided toggle rate and the load capacity of the corresponding wireline, and the second toggle rate is calculated by assigning the load capacity into the relational expression.

8. A non-transitory storage medium storing thereon a power consumption analysis program, according to claim 1, wherein the first circuit data set is a circuit data set preliminarily provided, and the second circuit data set is a new circuit data set obtained through a change in the preliminarily provided circuit data set, the first toggle rates are respectively preliminarily provided for the plurality of wirelines included in the circuit data set preliminarily provided, and when load capacities of the wirelines included in the new circuit data set and the load capacities of the wirelines included in the preliminarily provided circuit data set are identical to one another for a plurality of wirelines included in the new circuit data set, the second toggle rates are set as the first toggle rates, but when the load capacities of the wirelines included in the new circuit data set and the load capacities of the wirelines included in the preliminarily provided circuit data set are not identical to one another, the second toggle rates are calculated in accordance with the corresponding load capacities and correlations.

9. A non-transitory storage medium storing thereon a power consumption analysis program, according to claim 8, wherein load capacities are calculated in units of a section, and the correlation includes an average of the load capacities of wirelines belonging to the section, and the second toggle rates are set as the average in the correlation.

10. A non-transitory storage medium storing thereon a power consumption analysis program, according to claim 1, wherein the first circuit data set is one part of the preliminarily provided circuit data set, and the second circuit data set is the other part of the preliminarily provided circuit data set, the first toggle rates are preliminarily provided for a plurality of wirelines included in the one part of the circuit data set, and the second toggle rates are preliminarily calculated for a plurality of wirelines included in the other part of the circuit data set in accordance with corresponding load capacities and correlations.

11. A non-transitory storage medium storing thereon a power consumption analysis program, according to claim 10, wherein the correlation is determined as a relational expression between the corresponding toggle rate and load capacity through a least squares method in accordance with the preliminarily provided toggle rate and the load capacity of the corresponding wireline, and the second toggle rate is calculated by assigning the load capacity into the relational expression.

12. A non-transitory storage medium storing thereon a power consumption analysis program, according to claim 1, wherein the power consumption analysis program further causes the computer to execute a process of calculating power consumptions for the plurality of wirelines included in the first circuit data set in accordance with the load capacities and calculated toggle rates of the wirelines.

13. A non-transitory storage medium storing thereon a power consumption analysis program, according to claim 12, wherein the power consumption analysis program further causes the computer to execute a process of calculating differentials between power consumptions of the first circuit data set and power consumptions of the second circuit data set for the plurality of wirelines included in the first circuit data set.

14. A non-transitory storage medium storing thereon a power consumption analysis program, according to claim 13, wherein the power consumption analysis program further causes the computer to execute a process of highlight displaying a wireline having a largest differential of the calculated differentials in a circuit diagram of a semiconductor circuit displayed in accordance with the second circuit data set.

15. A power consumption analysis method to be executed in a power consumption analysis apparatus, the method comprising the steps of:
preliminarily providing a first toggle rate of each of a plurality of wirelines included in a first circuit data set;
generating a correlation in accordance with each first toggle rate and each load capacity of the corresponding wireline, each correlation being indicative of a relationship between the first toggle rate and the load capacity; and
calculating a second toggle rate of each of a plurality of wirelines included in a second circuit data set, in accordance with a load capacity of a corresponding wireline and the corresponding correlation.

16. A power consumption analysis apparatus, comprising:
an toggle rate storage unit for preliminarily providing a first toggle rate of each of a plurality of wirelines included in a first circuit data set;
a correlation generating unit for generating a correlation in accordance with each first toggle rate and each load capacity of the corresponding wireline, each correlation being indicative of a relationship between the first toggle rate and the load capacity; and
an toggle rate calculating unit for calculating a second toggle rate of each of a plurality of wirelines included in a second circuit data set, in accordance with a load capacity of a corresponding wireline and the corresponding correlation.

* * * * *